(12) United States Patent
Stone et al.

(10) Patent No.: US 11,815,952 B2
(45) Date of Patent: Nov. 14, 2023

(54) MODULAR DOCK FOR MOBILE COMPUTING DEVICES

(71) Applicant: ZEBRA TECHNOLOGIES CORPORATION, Lincolnshire, IL (US)

(72) Inventors: Lawrence Allen Stone, Austin, TX (US); David William Reber, Cedar Park, TX (US); Brian D. Ryder, Leander, TX (US); Chad Chaumont, Mount Sinai, NY (US); Dennis Barrett, Allen, TX (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/168,717

(22) Filed: Feb. 5, 2021

(65) Prior Publication Data

US 2022/0253096 A1  Aug. 11, 2022

(51) Int. Cl.
| | | |
|---|---|---|
| *G06F 1/16* | (2006.01) | |
| *F16M 11/04* | (2006.01) | |
| *F16M 13/00* | (2006.01) | |
| *G06F 1/20* | (2006.01) | |

(52) U.S. Cl.
CPC ......... *G06F 1/1632* (2013.01); *F16M 11/041* (2013.01); *G06F 1/1683* (2013.01); *F16M 13/00* (2013.01); *G06F 1/203* (2013.01)

(58) Field of Classification Search
CPC ... G06F 1/1632; G06F 1/1683; F16M 11/041; F16M 13/00
See application file for complete search history.

(56) References Cited

U.S. PATENT DOCUMENTS

| | | | |
|---|---|---|---|
| 8,373,980 B2 | 2/2013 | Reber | |
| 8,699,216 B2 | 4/2014 | Reber | |
| 8,873,233 B2 * | 10/2014 | Reber | .................... G06F 1/1632 |
| | | | 361/679.01 |
| 9,134,763 B2 | 9/2015 | Degiovine | |
| 9,450,632 B1 * | 9/2016 | McElroy | .............. H04B 1/3877 |
| 2004/0190238 A1 * | 9/2004 | Hubbard | ............ F16M 11/2021 |
| | | | 361/679.09 |
| 2005/0057896 A1 * | 3/2005 | Homer | .................... G06F 1/166 |
| | | | 710/303 |
| 2005/0128693 A1 * | 6/2005 | Itoh | ........................ G06F 1/1656 |
| | | | 361/679.26 |
| 2010/0081377 A1 * | 4/2010 | Chatterjee | ............. G06F 1/1632 |
| | | | 455/41.1 |
| 2010/0195279 A1 * | 8/2010 | Michael | ................ G06F 1/1632 |
| | | | 361/679.41 |
| 2013/0104364 A1 * | 5/2013 | Carnevali | ............. G06F 1/1632 |
| | | | 29/428 |

(Continued)

FOREIGN PATENT DOCUMENTS

DE    102020112253 A1 * 11/2021

*Primary Examiner* — Nidhi Thaker

(57) ABSTRACT

A dock for a computing device includes: a cradle configured to receive a first edge of the computing device; a body extending from the cradle, the body having: (i) a first mounting surface configured to removably support a first accessory module in a first volume adjacent to the computing device, and (ii) a second mounting surface configured to removably support, independently of the first accessory module, a second accessory module in a second volume disjoint from the first volume.

20 Claims, 16 Drawing Sheets

(56) References Cited

U.S. PATENT DOCUMENTS

| | | | |
|---|---|---|---|
| 2013/0182387 A1* | 7/2013 | Mere | H04M 1/04 |
| | | | 361/679.55 |
| 2015/0129724 A1* | 5/2015 | Kohmoto | F16M 11/041 |
| | | | 248/316.4 |
| 2021/0072792 A1* | 3/2021 | DeCamp | F16M 11/2014 |
| 2022/0113762 A1* | 4/2022 | Campbell | F16M 11/22 |

* cited by examiner

MODULAR DOCK FOR MOBILE COMPUTING DEVICES

BACKGROUND

A mobile device, such as a tablet computer or a laptop computer, can be affixed to a dock, e.g. to support the device for use by an operator of other equipment such as a truck or other vehicle, or to support the device on a desk or other work surface. The dock may provide electrical power to the device. In some operating environments, however, the dock may also be expected to provide other functions, such as data connectivity or the like. The diversity of environments in which the mobile device may operate can involve the provision of various different docks, each able to perform a certain subset of functions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
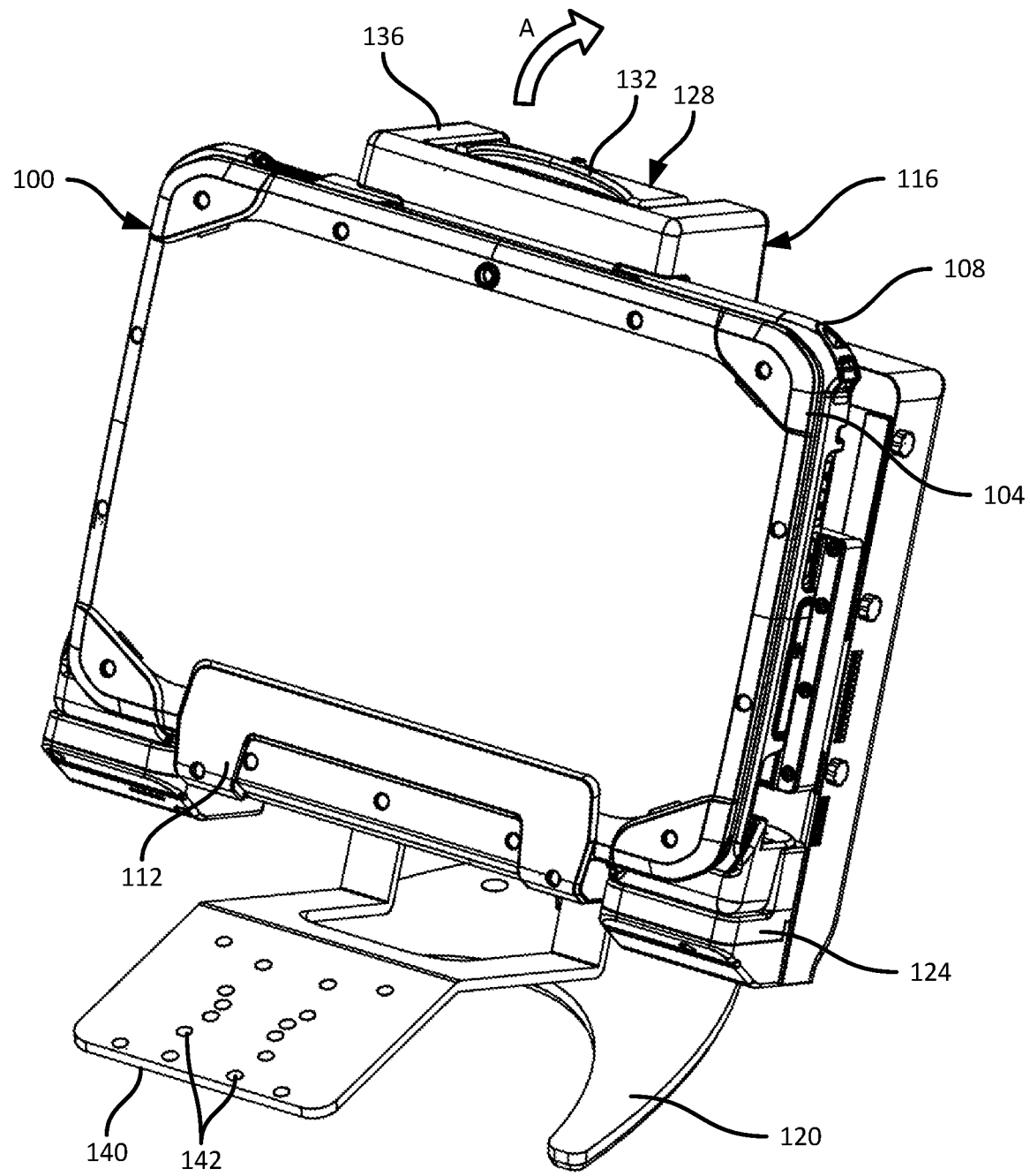
FIG. 1 is a diagram of a computing device and a dock.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a dock for a computing device, the dock comprising: a cradle configured to receive a first edge of the computing device; a body extending from the cradle, the body having: (i) a first mounting surface configured to removably support a first accessory module in a first volume adjacent to the computing device, and (ii) a second mounting surface configured to removably support, independently of the first accessory module, a second accessory module in a second volume disjoint from the first volume.

Additional examples disclosed herein are directed to a docking system, comprising: a dock including: a cradle configured to receive a first edge of the computing device, and having a first connector opening; a body extending from the cradle, the body having a first mounting surface configured to removably support a first accessory module in a first volume adjacent to the computing device; a power module affixed to the cradle and having power connector extending through the first connector opening; and a removable accessory module affixed to the first mounting surface.

Further examples disclosed herein are directed to a dock for a computing device, the dock comprising: a cradle configured to receive a first edge of the computing device; a peripheral device coupled to the cradle; a presence sensor coupled to the cradle, the presence sensor configured to: detect the presence of the computing device, and enable or disable the peripheral device according to the detection.

FIG. 1 illustrates a computing device 100, such as a tablet computer or a laptop computer. In the illustrated example, the computing device 100 includes a keyboard 104 coupled to a chassis 108 of the device 100 via a hinge assembly 112. In the configuration illustrated in FIG. 1, the keyboard 104 is folded against the chassis 108.

FIG. 1 also illustrates a dock 116 configured to releasably secure the device 100, permitting the device 100 to be affixed to a work surface such as a desk (e.g. via a stand 120 of the dock 116), a vehicle, or the like. The dock 116 includes a cradle 124 configured to support a first edge of the device 100, and a lock assembly 128 configured to engage with an opposing second edge of the device 100 to secure the device 100 against the cradle 124. For example, the lock assembly 128 can include a rotatable cam 132, shown in a closed position to force a locking member 136 downwards onto the upper edge of the device 100. The locking member 136 includes a blade 138 extending downwards therefrom (e.g. towards the cradle 124), to engage with the device 100 and retain the device 100 against the dock 116.

The cam 132 can be manipulated to rotate in the direction "A" towards an open position, enabling springs or another lifting mechanism to lift the locking member 136 off the device 100, enabling removal of the device 100 from the dock 116.

The dock 116 also includes various structural features enabling modules to be attached to and removed from a base portion of the dock, including the stand 120 and a keyboard bracket 140. They keyboard support bracket 140 includes a plurality of mounting holes 142 positioned for compatibility with various keyboards attachable to the device 100. For example, the device 100 may be coupled with a plurality of third-party keyboards, each with a distinct set of mounting points thereon. Therefore, as will be discussed in greater detail below, the base portion of the dock 116 can be deployed in a wide variety of operating environments, and modified in the field to affix or remove necessary ones of the above-mentioned modules.

Figure 2:
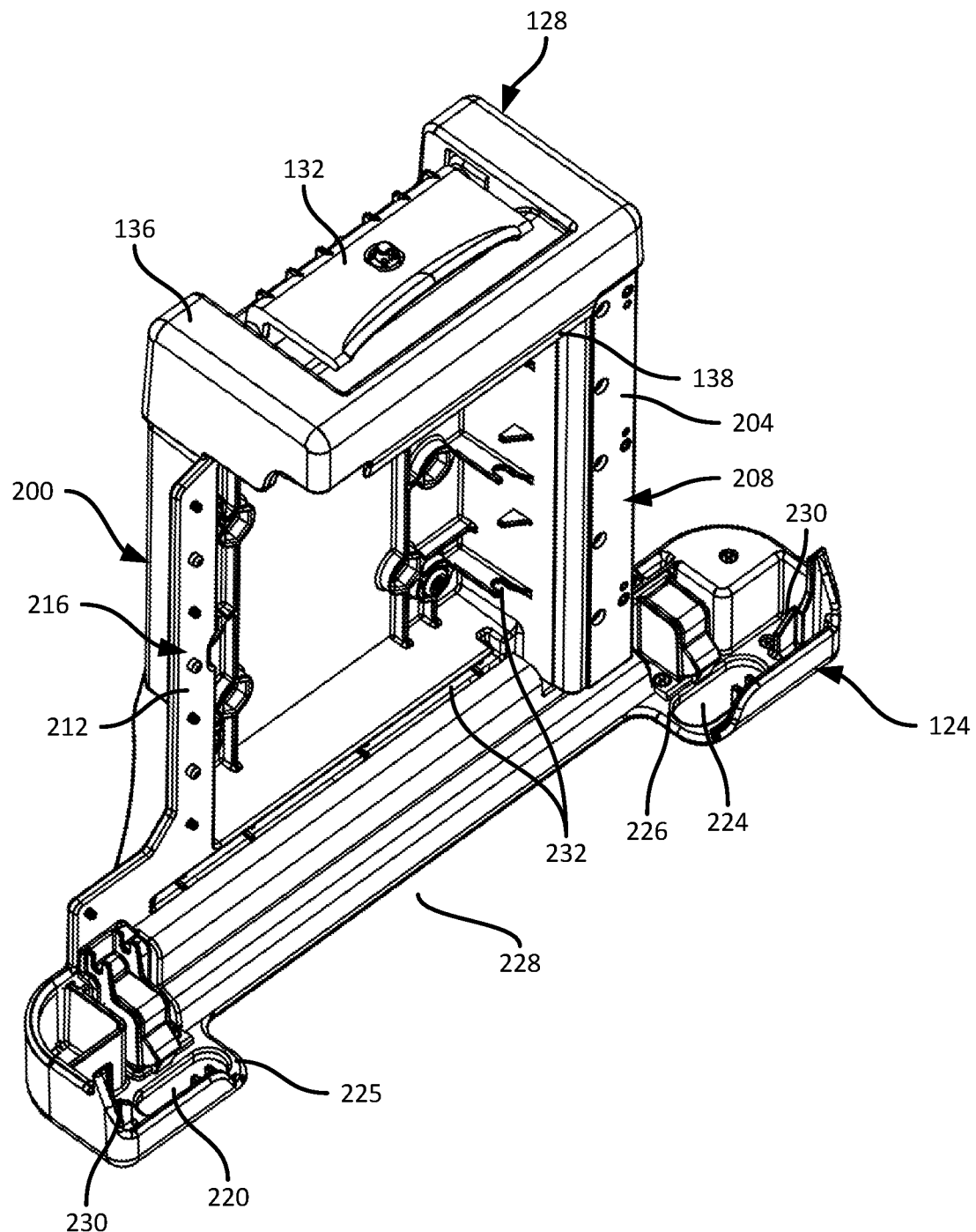
FIG. 2 is an isometric view of a body portion of the dock of FIG. 1.

Turning to FIG. 2, the above-mentioned base portion of the dock 116 is shown in isolation. In particular, FIG. 2 illustrates the cradle 124 and the lock assembly 128, as well as a body 200 extending between the cradle 124 and the lock assembly 128. For example, the cradle 124, the body 200, and a portion of the lock assembly 128 may be molded as a single piece of plastic or other suitable material. The cam 132 and the locking member 136 are movably attached to the body 200.

The body 200 includes a set of mounting surfaces thereon, each of which is configured to support a particular accessory module in a given volume. As will be apparent in the discussion below, the mounting surfaces for each accessory module are distinct from one another, such that the installation of one module does not depend on the presence or absence of another. The volumes containing the various modules are also distinct, in that no volume overlaps with any other volume, again enabling the installation of any combination of modules without any two modules interfering with one another. The volumes may therefore also be referred to as disjoint (i.e. sharing no space between one another).

The body 200, in this example, includes a first mounting surface 204, in the form of a flange 208 extending outwards from the body 200 (e.g. towards an outer end of the cradle 124) from a perimeter of the body 200. That is, the first mounting surface 204 is the forward (e.g. facing towards the device 100, when the device 100 is docked) surface of the flange 208. The body 200 also includes a second mounting surface 212, in the form of a forward surface of an additional flange 216 extending from the perimeter of the body 200. The flange 216, in this example, is disposed on an opposite side of the body 200.

The mounting surfaces 204 and 212 are configured to support respective accessory modules of the dock 116 in distinct volumes adjacent to the device 100 (when the device 100 is docked), enabling the dock 116 to provide additional functionality to the device 100 when such modules are affixed to the dock via the mounting surfaces 204 or 212. Examples of such modules will be discussed in greater detail further below.

As also shown in FIG. 2, the cradle 124 includes at least a first connector opening 220 therein. In this example, the cradle 124 also includes a second connector opening 224. The connector openings 220 and 224 enable the installation of power and/or data connectors, which engage with corresponding ports of the device 100 when the device 100 is docked. As will be seen below, the connector opening 224 receives a connector of one of the above-mentioned modules, when that module is affixed to the body 200 via a mounting surface. The connector opening 220, in this example, receives a power connector of a power supply module that is mounted to the cradle 124, as discussed below in connection with FIG. 3.

The connector openings 220 and 224 are defined in respective support surfaces 225 and 226 of the cradle 124. The support surfaces 225 and 226 are configured to engage with the chassis 108 of the device 100, to retain (along with the lock assembly 128) the device 100 on the dock 116.

Between the support surfaces 225 and 226, the cradle 124 can include a cutout 228 to accommodate the hinge assembly 112 shown in FIG. 1. The cutout 228 thus allows the keyboard 104 to be opened and closed when the device 100 is docked, without interfering with the engagement between the dock 116 and the chassis 108 of the device 100. That is, when the device 100 is placed into the dock 116, the blade 138 engages with an upper edge of the chassis 108 while the support surfaces 225 and 226 engage with a lower edge of the chassis 108. The keyboard 104 itself, as well as the hinge assembly 112, are not placed in direct contact with any portion of the dock 116, and therefore remain mobile when the device 100 is docked, permitting opening and closing of the keyboard 104. In some examples, the cutout 228 also allows the device 100 to be docked while the keyboard 104 is in either the open or closed position. In other examples, the keyboard 104 must be closed in order to dock the device 100, to avoid interference between the keyboard 104 and the modules 300 and 600. After docking, the keyboard 104 may be opened in such examples.

The cradle 124 can also include alignment features to guide the device 100 into position during docking. For example, the cradle 124 as illustrated includes ribs 230 adjacent to the connector openings 220 and 224, configured to engage with opposing sides of the device 100.

The body 200 further includes at least one cable routing channel. As shown in FIG. 2, the forward side of the body 200 includes a channel 232, configured to retain a power cable that supplies power from the above-mentioned power module to an accessory module affixed to the mounting surface 204.

Figure 3:
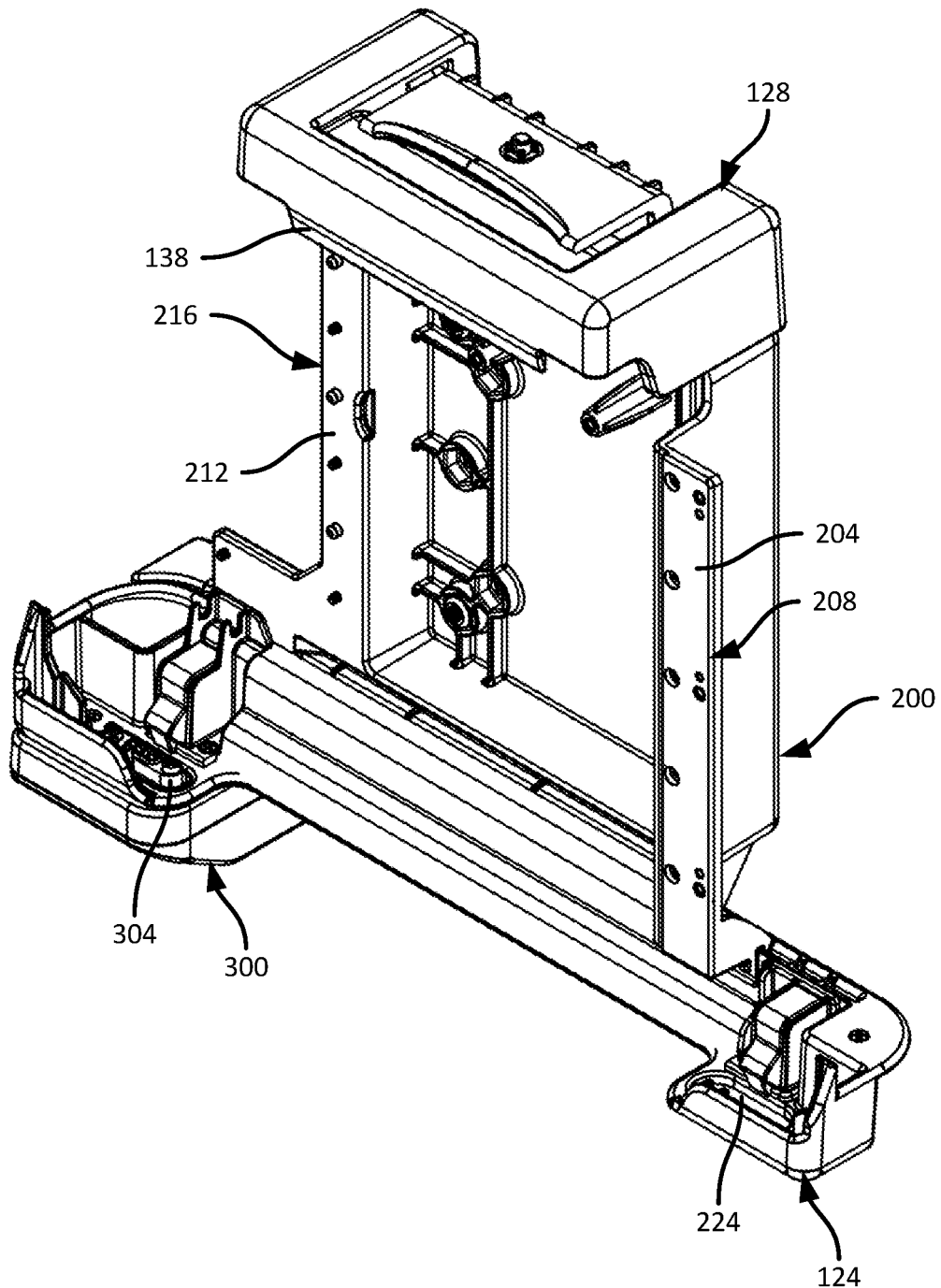
FIG. 3 is an isometric view of the body of FIG. 2, with a power module affixed thereto.

Turning to FIG. 3, the body 200, cradle 124 and locking assembly 128 are shown with a power module 300 coupled thereto. The power module 300 is affixed to the cradle 124, e.g. via fasteners such as screws or the like, and includes an input (not visible in FIG. 3) to receive electrical power from a source external to the dock 116. The power source can be an electrical outlet, a vehicle power plant, or the like. The power module 300 also includes an outlet (not visible in FIG. 3) that can be used to deliver electrical power to one or more accessory modules of the dock 116, and a power connector 304 configured to engage with a corresponding port of the device 100 to deliver electrical power to the device 100. As seen in FIG. 3, the connector 304 extends through the connector opening 220 of the cradle 124 when the power module is affixed to the dock 116.

Figure 4:
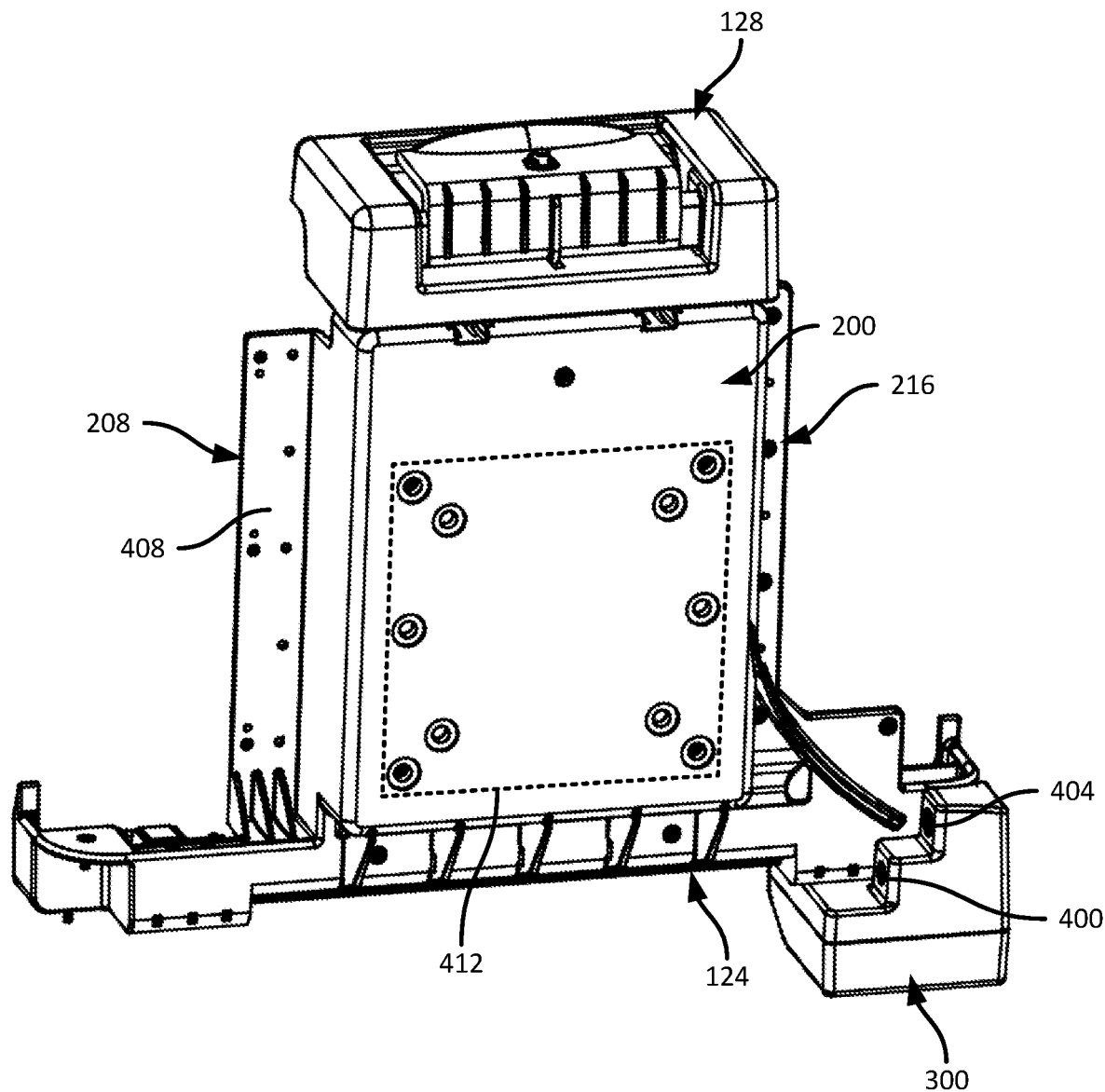
FIG. 4 is a rear view of the body portion of FIG. 3.

FIG. 4 illustrates the body 200, cradle 124, locking assembly 128, and power module 300 from the rear. From the rear of the dock 116, the above-mentioned power input 400 of the power module 300 is visible, as is the above-mentioned outlet 404. In addition, two additional mounting surfaces are shown in FIG. 4. In particular, the rear surface of the flange 208 forms a further mounting surface 408, which is configured to support another accessory module in a further volume distinct from the volumes in which the modules supported by the mounting surfaces 204 and 212 are supported, when present. In addition, FIG. 4 illustrates a mounting surface 412, on a rear surface of the body 200 (delimited in dashed lines for clarity). The mounting surface 412 supports yet another accessory module in a volume that is distinct from the previously mentioned volumes. The mounting surface 412, as will be seen below, can support either or both of two modules in the above-mentioned volume.

Figure 5:
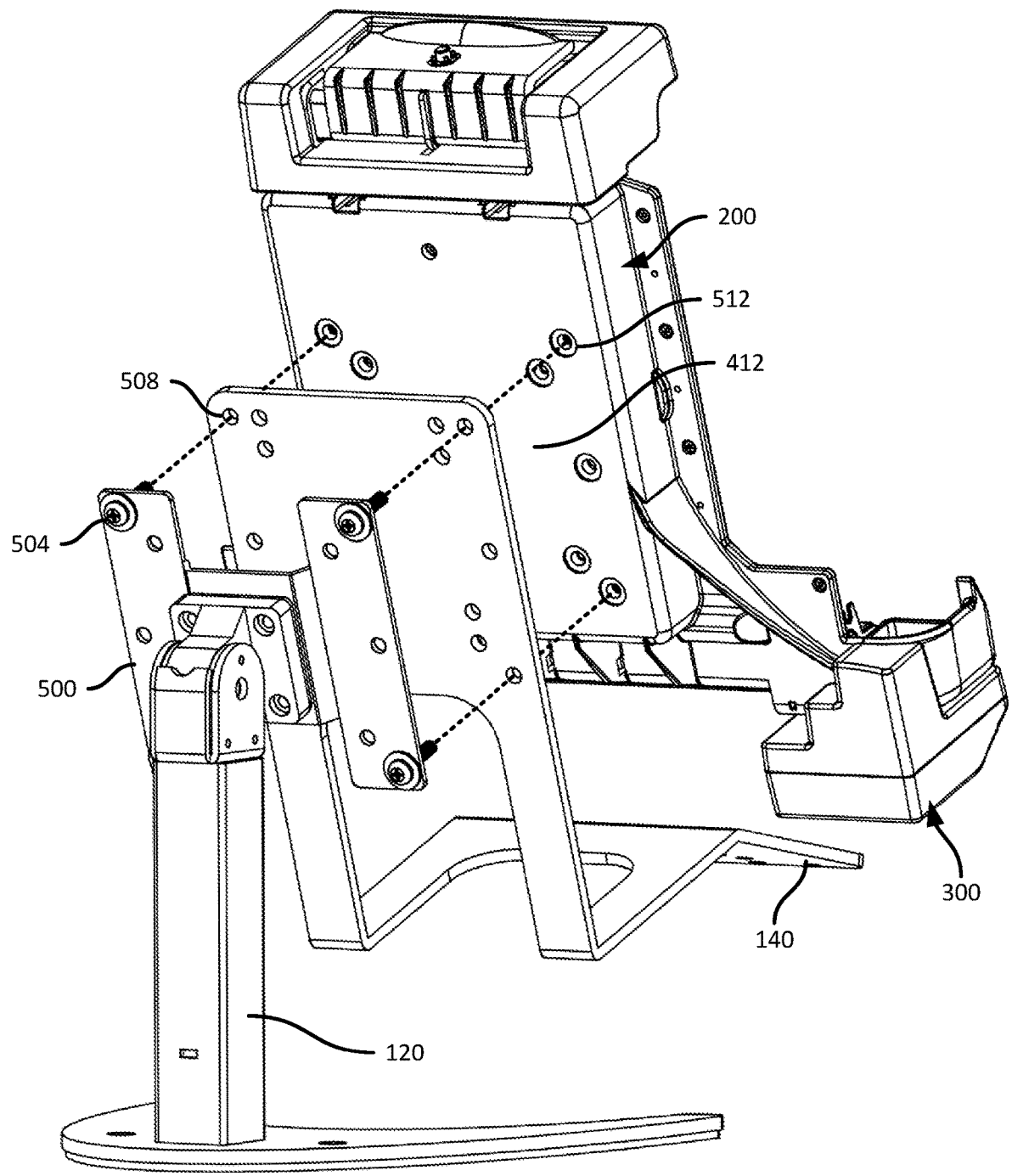
FIG. 5 is an exploded view of the body portion of FIG. 3 with a stand and a keyboard support bracket.

As shown in FIG. 5, the stand 120 includes a mounting plate 500 with openings therethrough to receive fasteners 504 such as bolts, screws or the like. The keyboard support bracket 140 also includes openings 508 therethrough, aligned with the openings 512. Further, the mounting surface 412 includes openings 512, e.g. which can extend through the body 200 for access at the forward surface of the body 200. As will now be apparent, the stand 120 can be affixed to the body 200 at the mounting surface 412 by installation of the fasteners 504. Alternatively, the keyboard support bracket 140 can also be installed by insertion of the fasteners 504 through the openings 508. Further, the stand 120 and the bracket 140 can be installed together by insertion of the fasteners 504 through both the openings of the mounting plate 500 and the openings 508 of the bracket 140. When bolts are used as fasteners, as in FIG. 5, nuts applied to the bolts may be applied from the forward surface of the body 200 (e.g. visible in FIGS. 2 and 3). In some examples, application of the nuts does not require removal of other accessory modules that may be mounted to the body 200.

Figure 6:
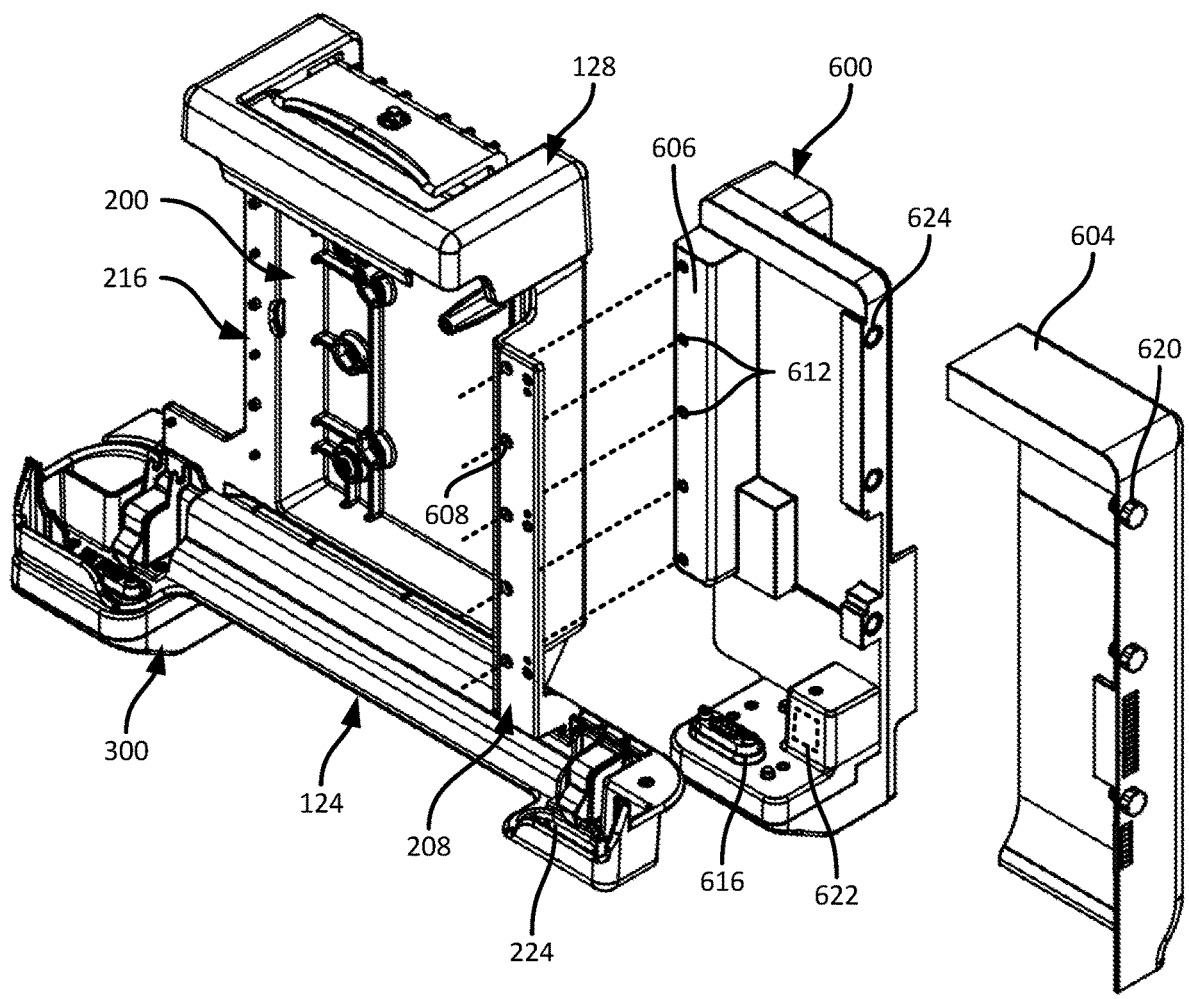
FIG. 6 is an exploded view of the body portion of FIG. 3 with a port extender module.

Turning to FIG. 6, an example mounting accessory for support by the mounting surface 408 introduced in connection with FIG. 4 is shown. In particular, FIG. 6 illustrates an exploded view of the body 200 and a port extender module 600, as well as a cover 604 for the port extender 600. The port extender 600 includes a mounting surface 606 complementary with the mounting surface 408 (on the rear surface of the flange 208, as noted earlier), and can thus be installed by placing the mounting surface 606 against the mounting surface 408 and applying fasteners such as screws or bolts via openings 608 in the flange 208, into openings 612 of the port extender 600, as shown by the dashed lines in FIG. 6.

The port extender 600 includes a data connector 616 that, when the port extender 600 is installed, extends through the connector opening 224 of the cradle 124 to engage with a corresponding port of the device 100. The port extender 600 further includes a plurality of additional ports electrically connected with the connector 616. The ports of the port extender 600 (visible in FIG. 10, which illustrates the port extender 600 with the cover 604 removed) can be connected to other computing devices, enabling the device 100 to connect to a plurality of devices via a single connector. The nature of the ports provided by the port extender 600 is not particularly limited. For example, the port extender 600 can include any suitable combination of Universal Serial Bus (USB) ports, Ethernet ports, and the like. The port extender 600, in some examples, can also include one or more video ports, such as a high-definition multimedia interface (HDMI) port or the like. The port extender 600 may include circuitry associated with the video port on a separate support member (e.g. a PCB) from the circuitry associated with the other ports mentioned above, to facilitate manufacturing of versions of the port extender 600 with and without video connectivity.

The cover 604 can be affixed to the port extender 600 via fasteners such as thumbscrews 620 inserted into openings 624 on the port extender 600. The cover 604 can be installed and removed either before or after installation of the port extender 600 onto the body 200. The cover 604 prevents water and dust from entering the ports of the extender 600, and can also provide strain relief to cables plugged into the port extender.

As discussed below, the port extender 600 draws electrical power from the power module 300. The connector 304 of the power module 300 includes a detection pin to detect the presence of the device 100 and thereby enable power delivery. The port extender 600 can include additional detection features to avoid the additional complexity and expense of implementing communications between the power module 300 and the port extender 600, and to avoid the need to implement additional pins in the connector 616. Specifically, the port extender 616 can include a contactless presence detection sensor 622, such as a Hall-effect sensor, embedded within the port extender 600 adjacent to the connector 616.

The sensor 616 is configured to switch on any suitable peripheral within the port extender 600 when a complementary component (e.g. a magnet) within the device 100 is detected. The sensor 622 may, in other words, enable the port extender 600 to begin supplying power to the above-mentioned USB and/or Ethernet ports, to power cycle components including such ports and/or associated controllers, perform USB enumeration and the like, without requiring the implementation of additional contacts on the connector 616 or communication between the power module 300 and the port extender 600. In further embodiments, the port extender 600 can include a wireless communications interface (e.g. ultra-wideband, Bluetooth, or the like) to connect to the device 100 instead of, or in addition to, the connector 616. In such examples, the sensor 622 can also switch such an interface on or off based on the detected presence or absence of the device 100.

Figure 7:
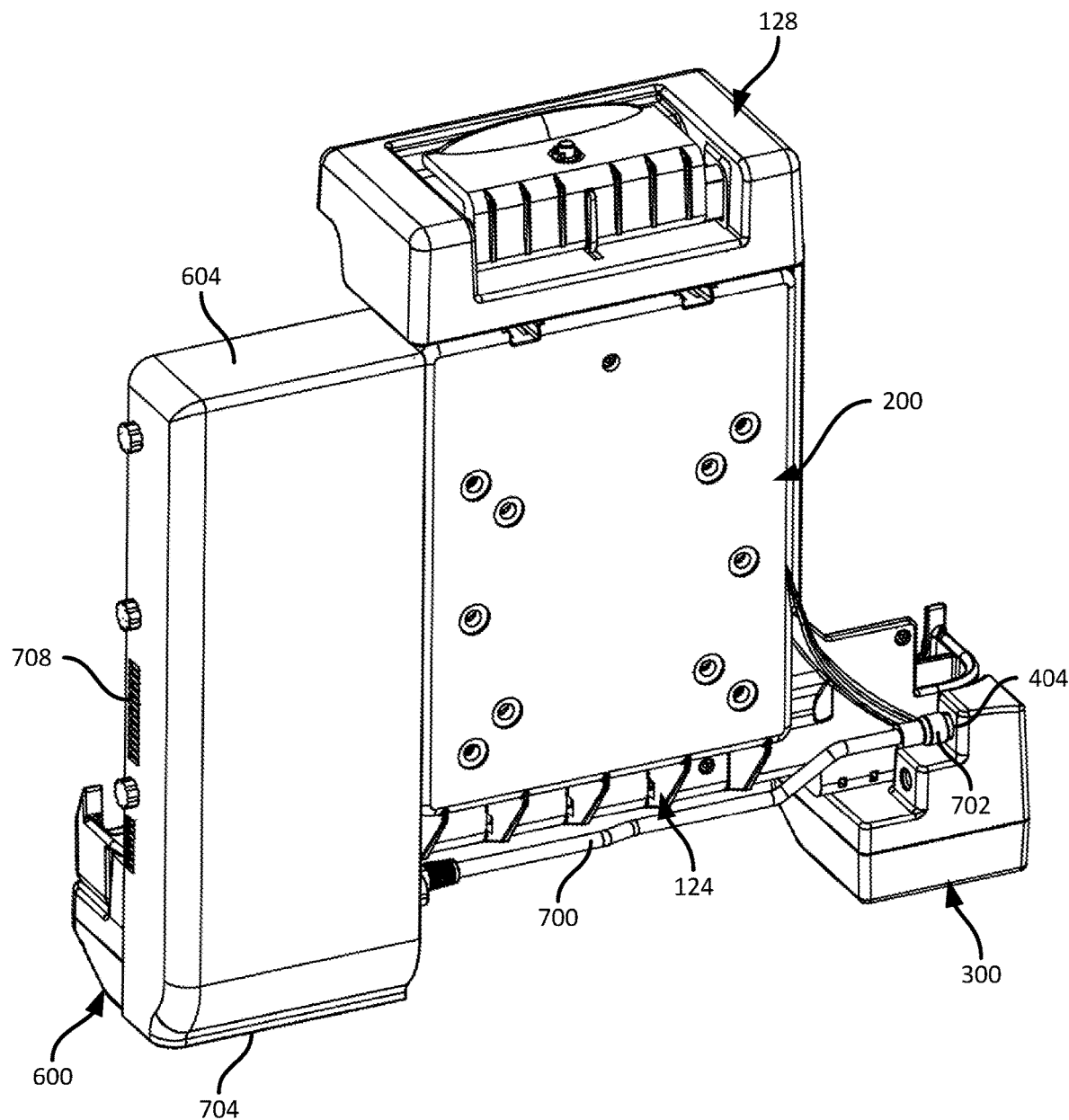
FIG. 7 is a rear view of the body portion and port extender module of FIG. 6.

Turning to FIG. 7, the port extender 600 and cover 604 are shown after installation onto the body 200. In some examples, the port extender 600 requires electrical power, e.g. to implement USB hub and/or network switch functionality. The port extender 600 may be powered, after installation, by a cable 700 traversing a rear surface of the cradle 124 to the output port 404 of the power module 300. For example, the cable 700 can terminate in a plug 702 configured to engage with the port 404. When the cover 604 is installed, cables exiting the module 600 to connect to other computing devices may exit an opening at a lower end 704 of the cover 604. In addition, the cover 604 can include air inlets 708

Figure 8:
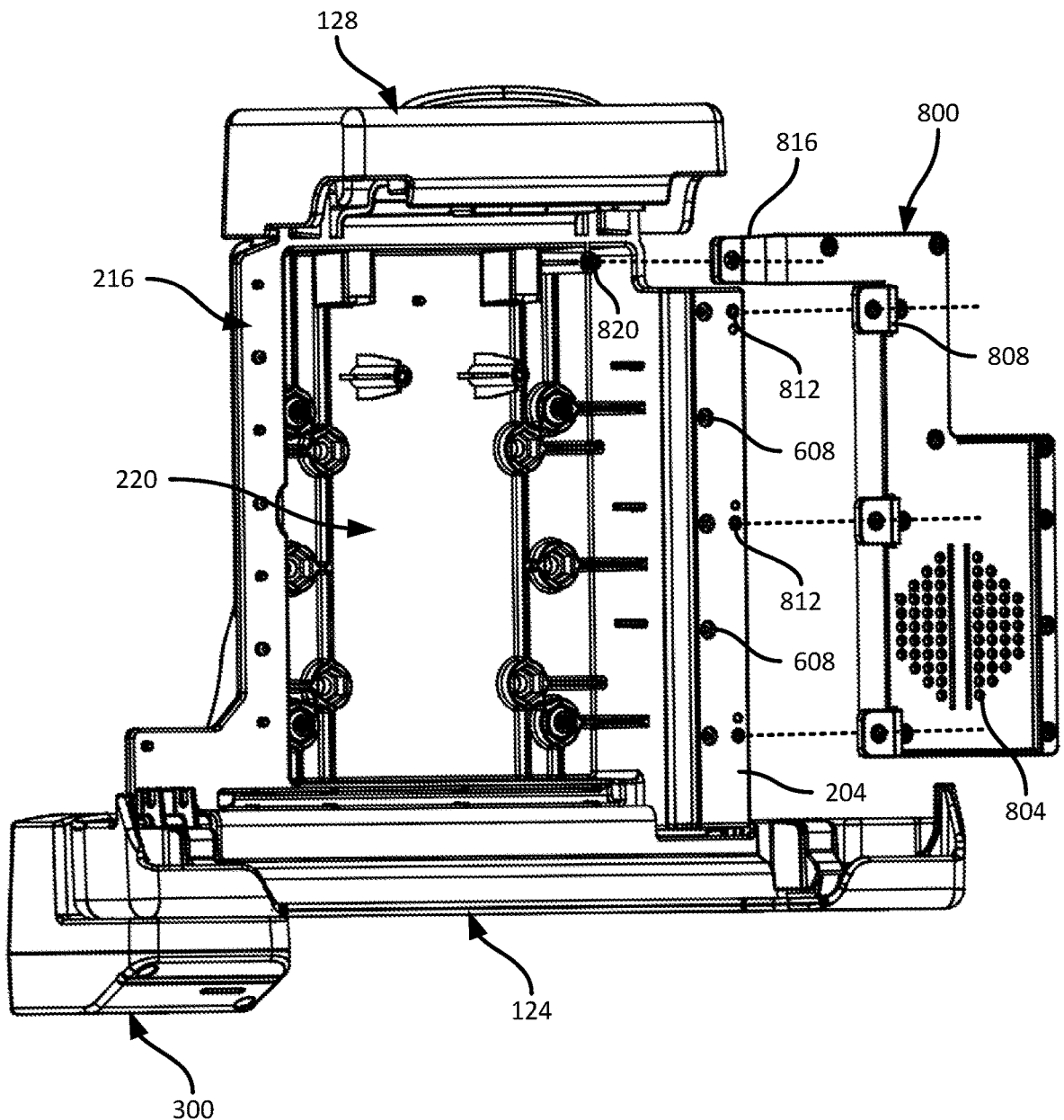
FIG. 8 is an exploded view of the body portion of FIG. 3 and a cooling module.

FIG. 8 shows the body 200 with the port extender 600 and cover 604 (as well as the stand 120 and bracket 140) omitted for clarity, to illustrate the installation of a further accessory module in the form of a cooling module 800. It will be understood, however, that the cooling module 800 can be installed whether the port extender 600, stand 120 and bracket 140 are present or not.

The cooling module 800 includes a body containing a fan configured to draw air into the body of the cooling module 800 and expel the air via a set of vents 804. When the cooling module 800 is installed, the vents 804 are disposed adjacent to a surface of the device 100. In some examples, the cooling module 800 is shaped so as to place the vents 804 adjacent to the portion of the device 100 housing a central processing unit (CPU) of the device 100. When operational, the above-mentioned fan blows ambient air onto the housing of the device 100, providing additional cooling to the CPU and/or other components of the device 100, in addition to any onboard cooling mechanisms of the device 100.

The cooling module 800 is installed by affixing mounting tabs 808 to the mounting surface 204. The tabs 808 can be affixed to the mounting surface 204 via fasteners such as screws, which are inserted through openings in the tabs 808 and into openings 812 on the mounting surface 204. As will now be apparent, the openings 812 are distinct from the openings 608 mentioned earlier, and the installation of the cooling module 800 does not impede access to the openings 608. The cooling module 800 and the port extender module 600 can therefore be installed in any order, without the installation of one interfering with installation of the other. As also seen in FIG. 8, in some examples the cooling module 800 can also be affixed to other portions of the body 200 than the mounting surface 204. In the illustrated example, the cooling module 800 includes an arm 816 configured to engage with a post 820 of the body 200, e.g. for fastening thereto.

Figure 9:
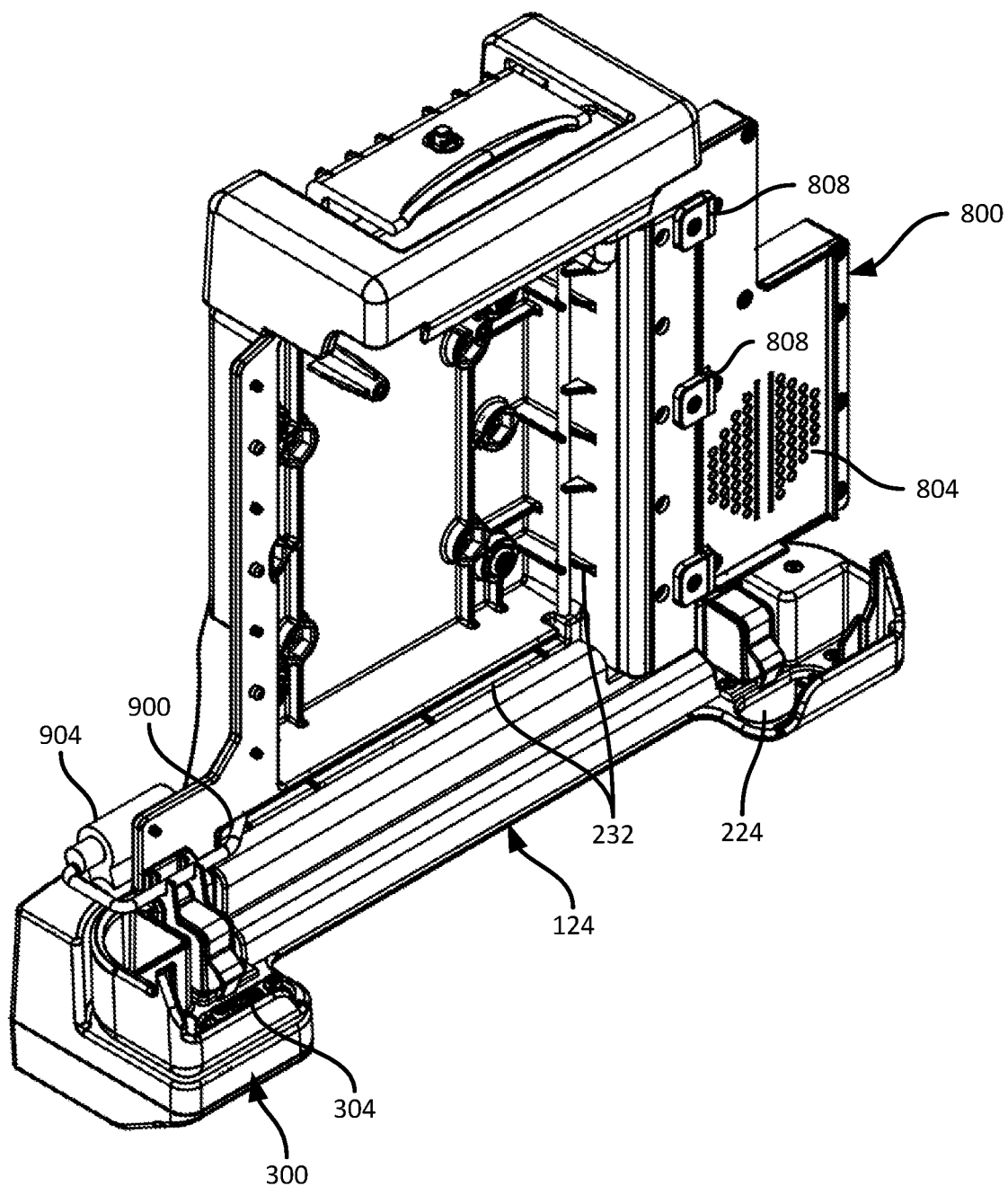
FIG. 9 is an isometric view of the dock as shown in FIG. 8 with the cooling module installed.

FIG. 9 illustrates the cooling module 800 in an installed position. The fan of the cooling module 800 may draw electrical power from the power module 300, via a cable 900 extending from the cooling module 800. The cable 900 may, for example, travel via the routing channel 232 noted earlier in connection with FIG. 2. As noted above, the power module 300 in the illustrated example includes a single output 404 (aside from the connector 304), and the port extender 600 may also draw power from the power module 300, as discussed in connection with FIG. 7. To accommodate both the modules 600 and 800, at least one of the cable 900 and the cable 700 can terminate in an adapter 904 configured to engage with the output 404 and provide two or more outputs.

Figure 10:
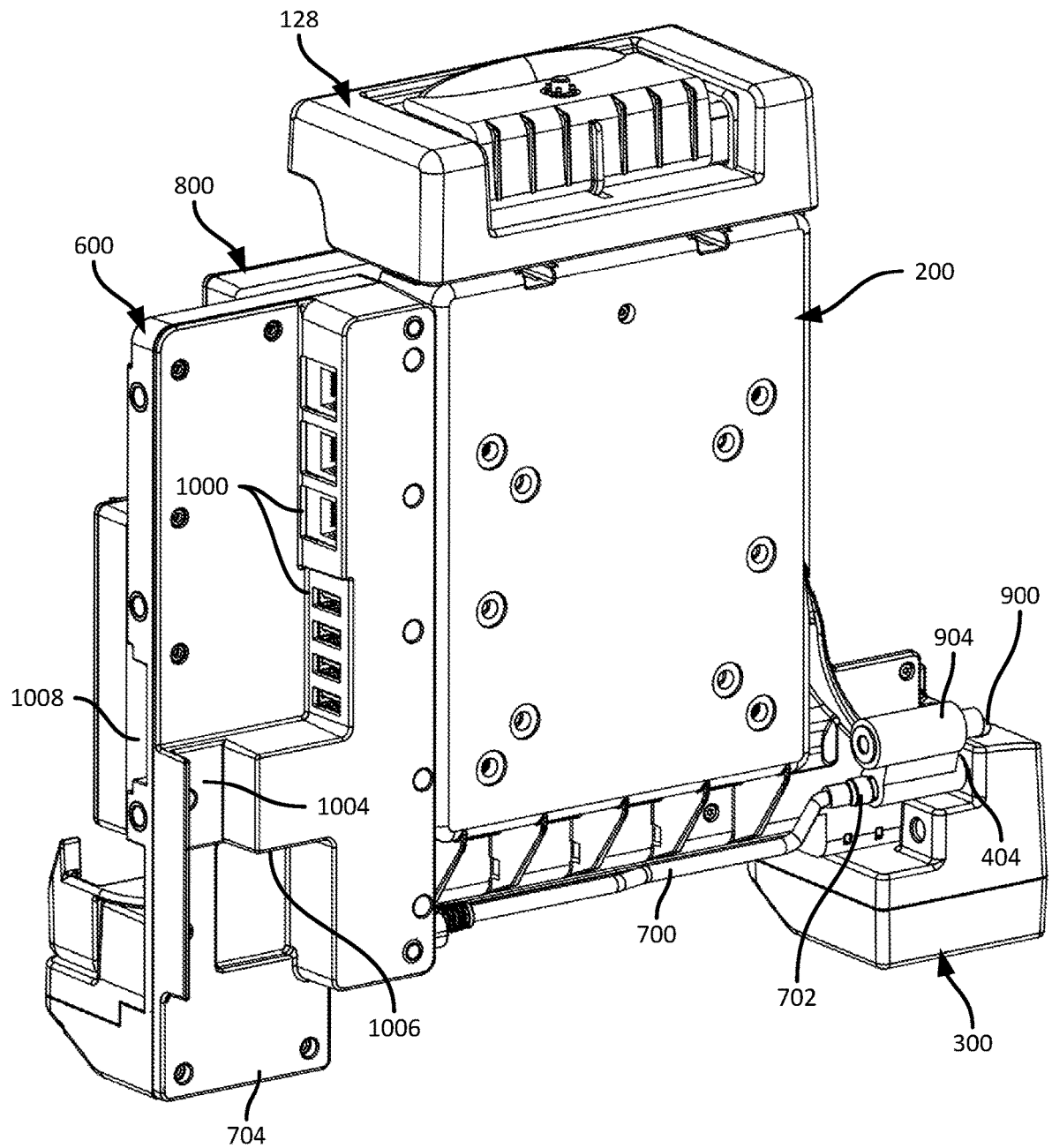
FIG. 10 is a rear view of the dock 116 with the port extender module of FIG. 6 and the cooling module of FIG. 9 installed.

As seen in FIG. 10, the adapter 904 plugs into the output 404 of the power module 300, and in turn provides outputs for receiving both the cables 700 and 900. The adapter 904 may be integrated with either of the cables 700 and 900, or the cables 700 and 900 may both terminate in plugs, jacks or the like that can be inserted into corresponding ports of the adapter 904. In the illustrated example, the adapter 904 is integrated with the cable 900, and includes a port for the cable 700. Thus, following installation of the cooling module 800 when the port extender 600 is present, the plug 702 is removed from the port 404, the adapter 904 is plugged into the port 404, and the plug 702 is then plugged into the adapter 904.

FIG. 10 also illustrates the port extender 600 and the cooling module 800 installed simultaneously. As seen in FIG. 10, the port extender 600 and the cooling module 800 occupy distinct volumes when installed, and therefore one does not interfere with the installation of the other. With the cover 604 omitted, a set of ports 1000 of the port extender 600 is visible. In this example, as noted earlier, the ports include USB ports and Ethernet ports. In examples including video connectivity, the ports may also include one or more video ports (e.g. HDMI), disposed on a wall 1006 of the port extender 1000. Cables extending from the ports 1000 travel through a channel 1004 defined by the port extender 600, to exit the port extender 600 via the lower end 704, as noted above in connection with FIG. 7. The port extender 600 also defines a cutout 1008 whose position coincides with the air inlets 708 of the cover 604, shown in FIG. 7, and with an air intake of the fan of the cooling module 800. The ports 1000 can be back sealed, e.g. with internal rubber covers, to prevent water and/or dust from entering the interior of the port extender 600.

Figure 11:
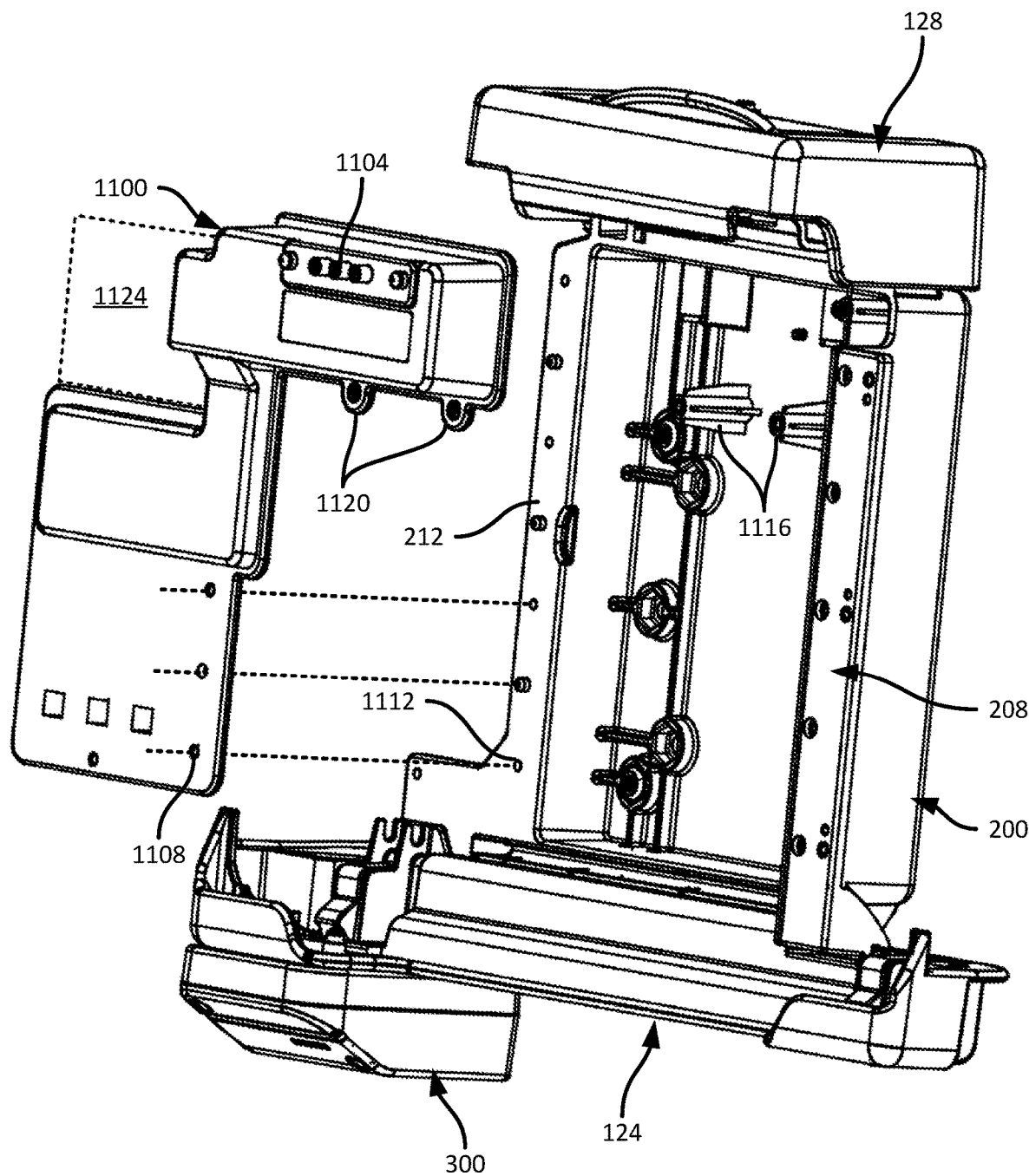
FIG. 11 is an exploded view of the body portion of FIG. 3 with an antenna passthrough module.

Turning to FIG. 11, a further accessory module, in the form of an antenna passthrough module 1100, is illustrated. The port extender 600, cooling module 800, stand 120 and bracket 140 are omitted from FIG. 11 for clarity, but it will be understood that any selection of those modules may also be installed prior to installation of the antenna passthrough module 1100.

The passthrough module 1100 includes at least one connector 1104 (three are shown in this example), such as a coaxial connector, configured to engage with corresponding ports on the device 100. The passthrough module 1100 enables, via engagement between the connector(s) 1104 and the device 100, external antennae (not shown) to be connected to the device 100. Such external antennae may extend the operational range of wireless connections used by the device 100, for example if the dock 116 is mounted in an environment in which nearby objects (e.g. vehicle bodies and the like) may reduce the performance of the internal antennae of the device 100.

The passthrough module 1100 is affixed to the mounting surface 212, e.g. via screws, bolts or the like inserted through openings 1108 in the module 1100 and into corresponding openings 1112 of the mounting surface 212. In some examples, the module 1100 may also be coupled to the body 200 at points other than the mounting surface 212, such as via posts 1116 extending forward from the body 200 and corresponding tabs 1120 of the module 1100. The module 1100 also includes, in this example, a cutout 1124 that corresponds to a position of a rear camera of the device 100, enabling continued use of the rear camera when the device 100 is docked and the passthrough module 1100 is present.

Figure 12:
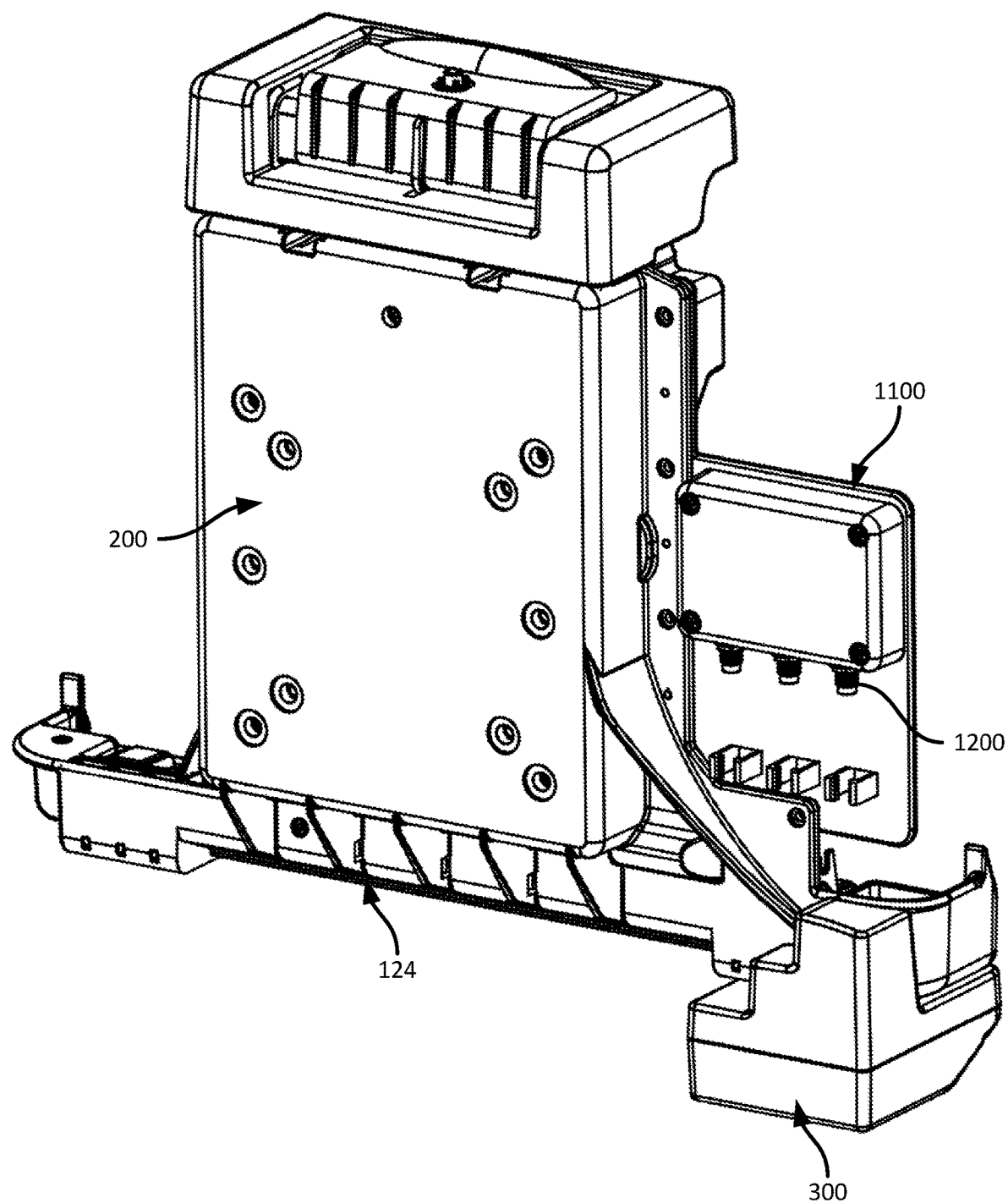
FIG. 12 is a rear view of the dock as shown in FIG. 11, with the antenna passthrough module installed.

FIG. 12 illustrates the dock 116 from the rear, with the antenna passthrough module 1100 installed. As seen in FIG. 12, the module 1100 also includes connectors 1200 for the above-mentioned external antennae.

Figure 13:
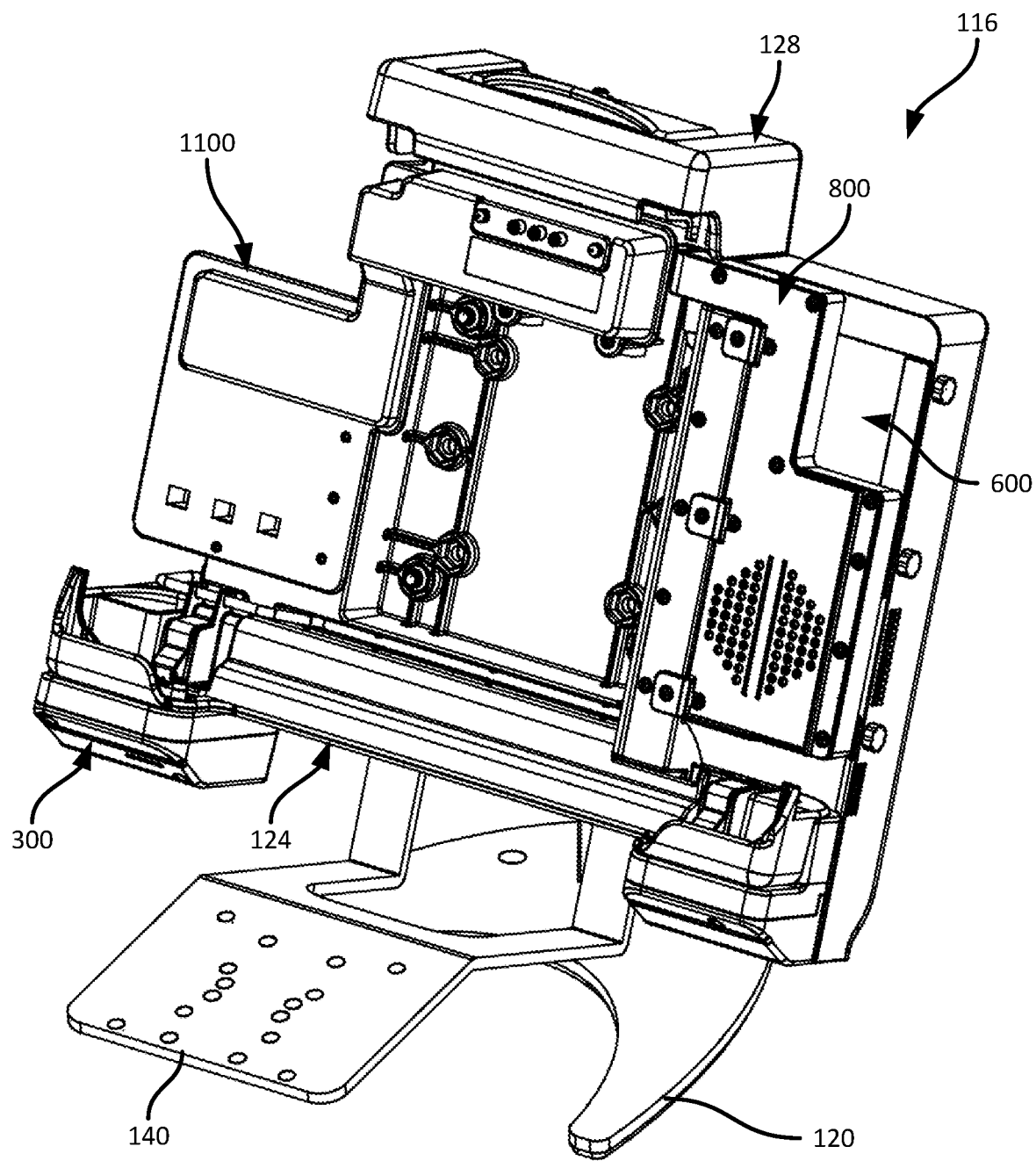
FIG. 13 is an isometric view of the dock of FIG. 1 without the computing device.

Turning to FIG. 13, the dock 116 is shown with each of the above-mentioned modules 600, 800, 1100, 120 and 140 installed. As is apparent from FIG. 13, the distinct volumes occupied by the various modules as a result of the configuration of their respective mounting surfaces enables any combination of modules to be affixed to the body 200, e.g. depending on the operational requirements where the dock 116 is deployed. In response to changes in such requirements, the dock 116 can also readily be reconfigured, e.g. by removing or installing the relevant modules, without affecting the other modules.

Figure 14:
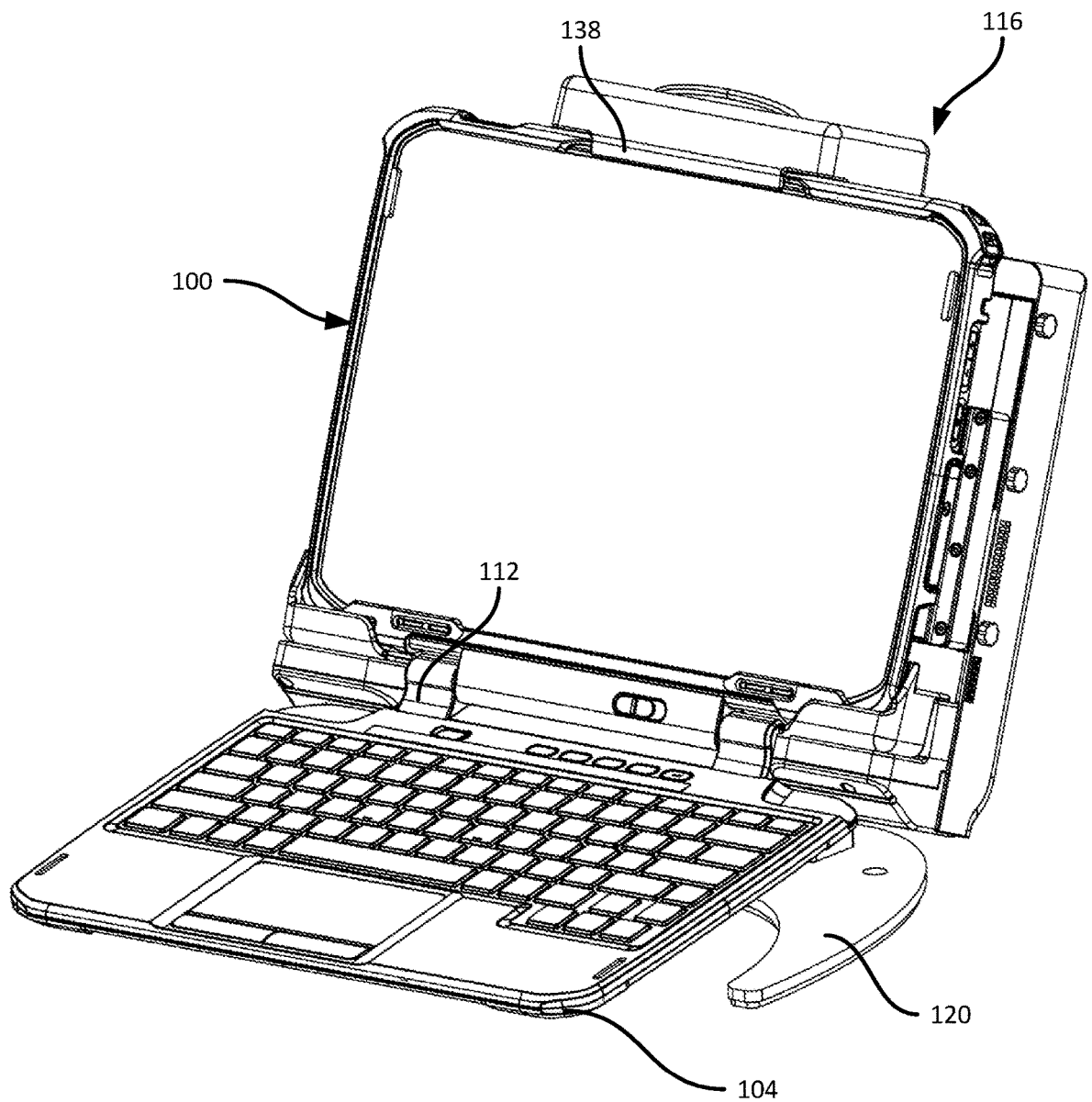
FIG. 14 is an isometric view of the dock and device of FIG. 1 with a keyboard of the device in an open position.

FIG. 14 illustrates the dock 116 as configured in FIG. 13, with the device 100 in a docked position. In addition, as mentioned earlier, the dock 116 can accommodate the device 100 with the keyboard 104 closed (as in FIG. 1), or open as shown in FIG. 14. The cutout 228 of the cradle 124, in particular, enables movement of the keyboard 104 while the device 100 is docked.

Figure 15:
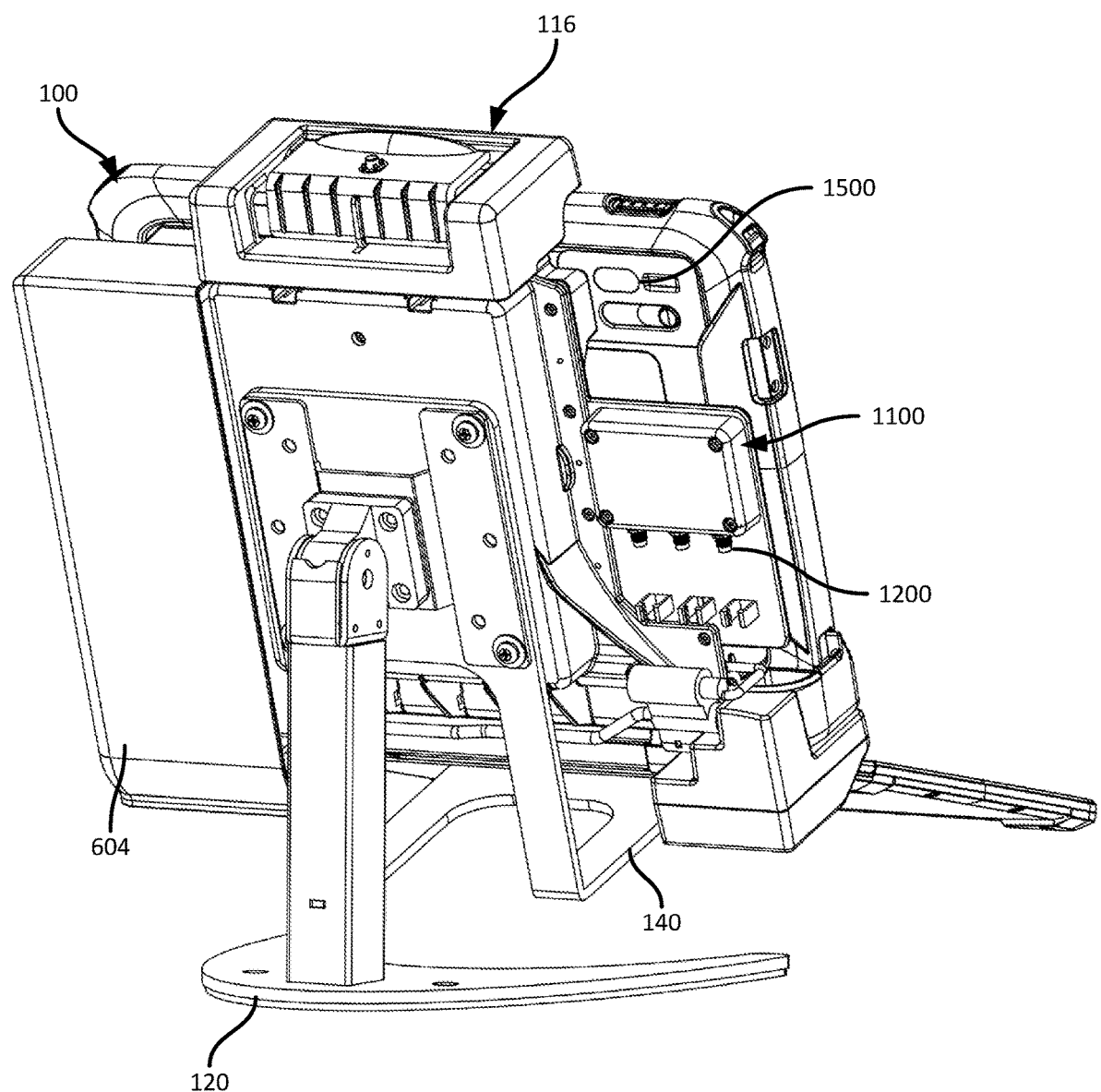
FIG. 15 is a rear view of the dock and device of FIG. 14.

FIG. 15 illustrates the dock 116 and device 100 as shown in FIG. 14, from the rear. In particular, FIG. 15 shows a rear camera 1500 of the device 100, which remains unobstructed when the device 100 is docked and the antenna passthrough module 1100 is installed on the dock 116, as a result of the cutout 1124 mentioned in connection with FIG. 11.

Figure 16:
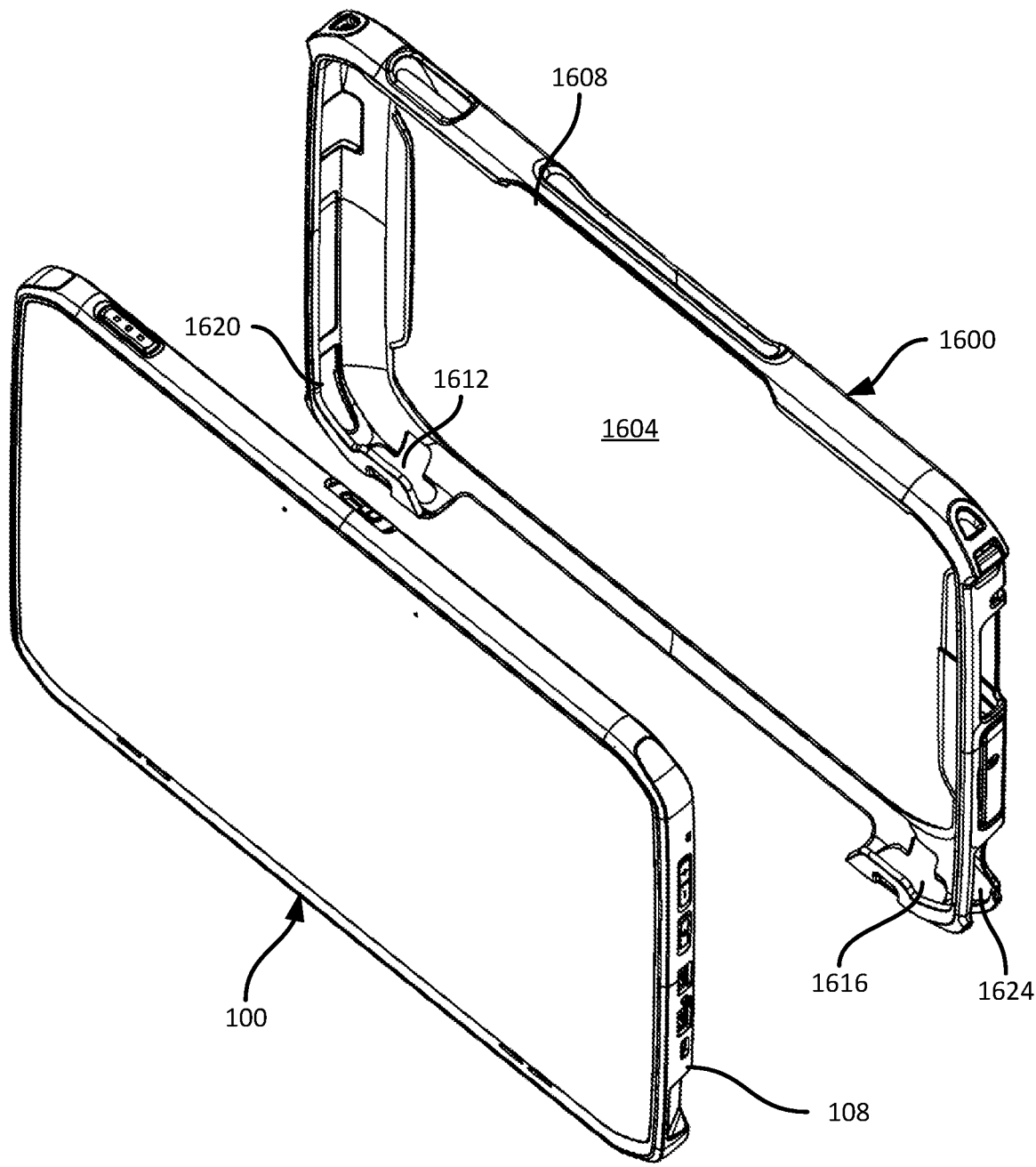
FIG. 16 is an exploded view of the computing device of FIG. 1 and an external protective housing thereof.

In addition to accommodating the device 100 with or without the keyboard 104, the dock 116 can also be configured to accommodate the device 100 with or without a external protective housing. Turning to FIG. 16, the device 100 is shown, with the keyboard 104 omitted, and with an external protective housing 1600 removed from the chassis 108 of the device 100. The protective housing 1600 can include a flexible plastic, rubber or the like, enabling the protective housing 1600 to be deformed to fit over the perimeter of the chassis 108, as shown in the preceding drawings (e.g. FIGS. 1, 14, and 15).

The protective housing 1600 includes an open back 1604, leaving the back of the device 100 exposed (e.g. to avoid obscuring the camera 1500). The protective housing 1600 also includes an upper cutout 1608 with a position corresponding to the position of the blade 138 when the device 100 is mounted to the dock 116. That is, the cutout 1608 enables the blade 138 to engage with the chassis 108 itself when the protective housing 1660 is on the device 100. The blade 138 therefore engages directly with the chassis 108 both with and without the protective housing 1600. Further the protective housing 1600 includes cutouts 1612, 1616, 1620, and 1624 corresponding with the positions of the connector openings 220 and 224, respectively. The cutouts 1612 and 1616 enable direct contact between the support surfaces 225 and 226 and the chassis 108, as well as direct contact between the connectors 304 and 616 and the chassis 108 (i.e. device connectors on the chassis 108). The cutouts 1620 and 1624 enable direct contact between the sides of the chassis 108 and the corresponding sides of the cradle 124 adjacent to the connector openings 220 and 224, e.g. at the ribs 230 mentioned in connection with FIG. 2. The cradle 124 therefore aligns and supports the chassis 108 whether or not the protective housing 1600 is present.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A dock for a computing device, the dock comprising:
a cradle configured to receive a first edge of the computing device; and
a body extending from the cradle, the body having:
(i) a first mounting surface configured to removably support a first accessory module in a first volume adjacent to the computing device, and
(ii) a second mounting surface configured to removably support, independently of the first accessory module, a second accessory module in a second volume disjoint from the first volume;
wherein the cradle includes:
a first connector opening and a second connector opening
a first support surface defining the first connector opening;
a second support surface defining the second connector opening; and
a cutout between the first and second connector openings to accommodate a keyboard hinge of the computing device.

2. The dock of claim 1, wherein at least one of the first accessory module and the second accessory module includes a data connector configured to extend through the first connector opening to engage with a port of the computing device.

3. The dock of claim 1, further comprising a power module affixed to the cradle and including a power connector extending through the second connector opening of the cradle to engage with a port on the first edge of the device.

4. The dock of claim 3, wherein the power module includes an output port configured to supply power to at least one of the first accessory module and the second accessory module.

5. The dock of claim 4, wherein the body includes a cable routing channel between the output port and at least one of the first volume and the second volume.

6. The dock of claim 1, wherein the first and second connector openings are at opposite sides of the cradle.

7. The dock of claim 1, further comprising a lock assembly connected to the body; wherein the first support surface, the second support surface, and the lock assembly are configured to engage with a chassis of the computing device to secure the computing device to the dock, and wherein a keyboard coupled to the chassis via the keyboard hinge remains free to move relative to the chassis when the computing device is secured to the dock.

8. The dock of claim 1, wherein the body includes a flange extending from a perimeter of the body;
wherein a forward side of the flange defines the first mounting surface; and
wherein a rear surface of the flange defines the second mounting surface.

9. The dock of claim 8, wherein the body further includes a third mounting surface configured to removably support, independently of the first and second accessory modules, a third accessory module in a third volume disjoint from the first and second volumes.

10. The dock of claim 9, wherein the body includes an additional flange on the perimeter, the additional flange defining the third mounting surface.

11. The dock of claim 1, wherein the body includes an additional mounting surface configured to removably support at least one of (i) a keyboard support bracket, and (ii) a desktop stand, independently of the first and second accessory modules, in an additional volume disjoint from the first and second volumes.

12. The dock of claim 11, wherein the additional mounting surface is on a rear surface of the body, opposite the cradle.

13. The dock of claim 1, wherein the cradle is configured to engage directly with a chassis of the computing device, (i) when the computing device includes an external protective housing, and (ii) when the external protective housing is removed.

14. The dock of claim 1, further comprising a presence sensor coupled to the cradle and configured to detect the presence of the computing device.

15. A docking system, comprising:
a dock including:
a cradle configured to receive a first edge of the computing device, and having a first connector opening;
a body extending from the cradle, the body having a first mounting surface configured to removably support a first accessory module in a first volume adjacent to the computing device;
a power module affixed to the cradle and having power connector extending through the first connector opening; and
a removable accessory module affixed to the first mounting surface;
wherein the accessory module includes an antenna passthrough module connecting an antenna port on a side of the device to an external antenna;
wherein the antenna passthrough module includes a cutout adjacent to a camera assembly of the computing device.

16. The docking system of claim 15, wherein the cradle further includes a second connector opening; and
wherein the accessory module includes a port extender module having a data connector configured to extend through the second connector opening, the port extender module configured to interconnect the data connector with a plurality of data ports connectable to other computing devices.

17. The docking system of claim 16, further comprising a cover removably attached to the port extender module.

18. The docking system of claim 15, wherein the accessory module includes a cooling module housing a fan.

19. The docking system of claim 15, further comprising a power adapter configured to receive power from an output of the power module, and deliver power to the accessory module.

20. The docking system of claim 15, further comprising a presence sensor coupled to the cradle and configured to detect the presence of the computing device.

* * * * *